United States Patent [19]
Aarre et al.

[11] Patent Number: 4,960,341
[45] Date of Patent: Oct. 2, 1990

[54] ARTICULATION JOINT

[75] Inventors: Arne Aarre; Knut S. Oaland, Sandnes, both of Norway

[73] Assignee: A/S Bolt, Sandnes, Norway

[21] Appl. No.: 412,934

[22] Filed: Sep. 26, 1989

[51] Int. Cl.⁵ .............................. F16B 1/00; F16D 1/00
[52] U.S. Cl. ........................................ 403/24; 403/162; 403/158
[58] Field of Search .................. 403/162, 161, 158, 24; 384/454

[56] References Cited

U.S. PATENT DOCUMENTS 3,168,359  2/1965  Murphy ..................... 384/454

FOREIGN PATENT DOCUMENTS 2612615  9/1988  France ..................... 403/158

Primary Examiner—Andrew V. Kundrat
Attorney, Agent, or Firm—Ladas & Parry

[57] ABSTRACT

An articulation joint is disclosed for use for example on back hoe boom assemblies wherein an articulated tool arm (2) is hinged-jointed to a boom fork (1) on the boom assembly in such a manner that shocks, knocks and vibrations to which said tool arm (2) is subjected cannot to a damaging extent propagate from said tool arm (2) to said boom fork (1). To this end the bearings of the articulation joint, comprising roller bearing (5) with ball bearing (7) at either end, are via their outer bearing race (6) and possibly a circumscribed metal ring (9) held in a circumscribed elastic shock ring (8) which is suitably formed as to permit installation within the eye of said tool arm (2).

9 Claims, 2 Drawing Sheets

ARTICULATION JOINT

BACKGROUND OF THE INVENTION (1) Field of the Invention

This invention relates to an articulation joint particularly for hinge-jointed boom assemblies of the type used on construction equipment as exemplified by power cranes and shovels, for example back hoes.

(2) Description of the Prior Art

An articulation joint known in the art for such purposes comprises an articulation pin supported in a plain (sleeve) bearing. Lubrication of said known articulation joint is by hand-operated grease gun.

In boom assemblies utilizing the said articulation joint known in the art, shocks and vibrations will propagate from the equipment tool, for example the shovel a back hoe, causing severe loads and fatigue strain on vital structural components, for example hydraulic ram, sleeve bearing, articulation pin, retaining fastenings and hydraulic power unit, and at the same time subjecting the equipment operator to shocks, knocks and shudder. Hard knocks and vibrations may cause screws, bolts and hinges to work loose, thereby resulting in damage for example to inspection hatch covers, engine cover, cabin, windscreens and instrumentation. Hard knocks and vibration from the shovel may also impair the working of accumulator batteries, radiator and oil coolers.

When clearing rock using the back hoe, for example, the shovel may be directly subjected to twisting moment (torque), which by virtue of the design and construction of the known articulation joint will propagate along the tool arm, causing severe shear and point loads on the bearings, apart from anything else. Damage to the bearing surfaces may ensue.

As already noted the articulation joint known in the art is lubricated by means of a hand-operated grease gun. Knocks to the shovel may force the grease out of the sleeve bearing. Poor lubrication will aggravate wear on the sleeve bearing and articulation pin, causing play in the joint. Play allows water and dirt to enter the articulation joint, progressively increasing wear. At low temperatures the grease solidifies in the grease gun. Thawing out the gun, for example using the exhaust silencer, is arduous and time-consuming. Inadequate greasing combined with penetration of contaminants into the articulation joint lead to greater friction and may result in locking up of the articulation joint and a fractured articulation pin. Failure of the articulation pin and excessive play in the articulation joint both involve serious risk, in particular to the equipment operator.

The articulation joint of the prior art utilizes metal shims to take up lateral forces acting. These shims are subject to severe wear. They are not capable of excluding dirt and water. As the shims wear down, significant lateral play in the articulation joint ensues.

SUMMARY OF THE INVENTION

The object of this invention is the provision of an articulation joint for the purposes as heretofore stated whereby the drawbacks of the known art are eliminated or at least greatly reduced.

This object is achieved by virtue of the features disclosed in this specification and claims.

An articulation joint of the type disclosed in the invention comprises an integral elastic shock absorber function whereby severe knocks, blows and vibrations, as caused for instance by an equipment tool, such as the shovel of a back hoe, are absorbed, thereby substantially reducing the force of the impacts propagating through the equipment.

The articulation joint of the invention comprises rubber packings the purpose of which is to restrain lateral play, said rubber packings being further suitably formed so as to exclude water and dirt from the joint.

One embodiment of the articulation joint of the invention is described more fully in the following by way of illustration not intended to imply a limitation in the scope of the invention with reference to the drawings, in which:

DETAILED DESCRIPTION OF THE INVENTION

Figure 1:
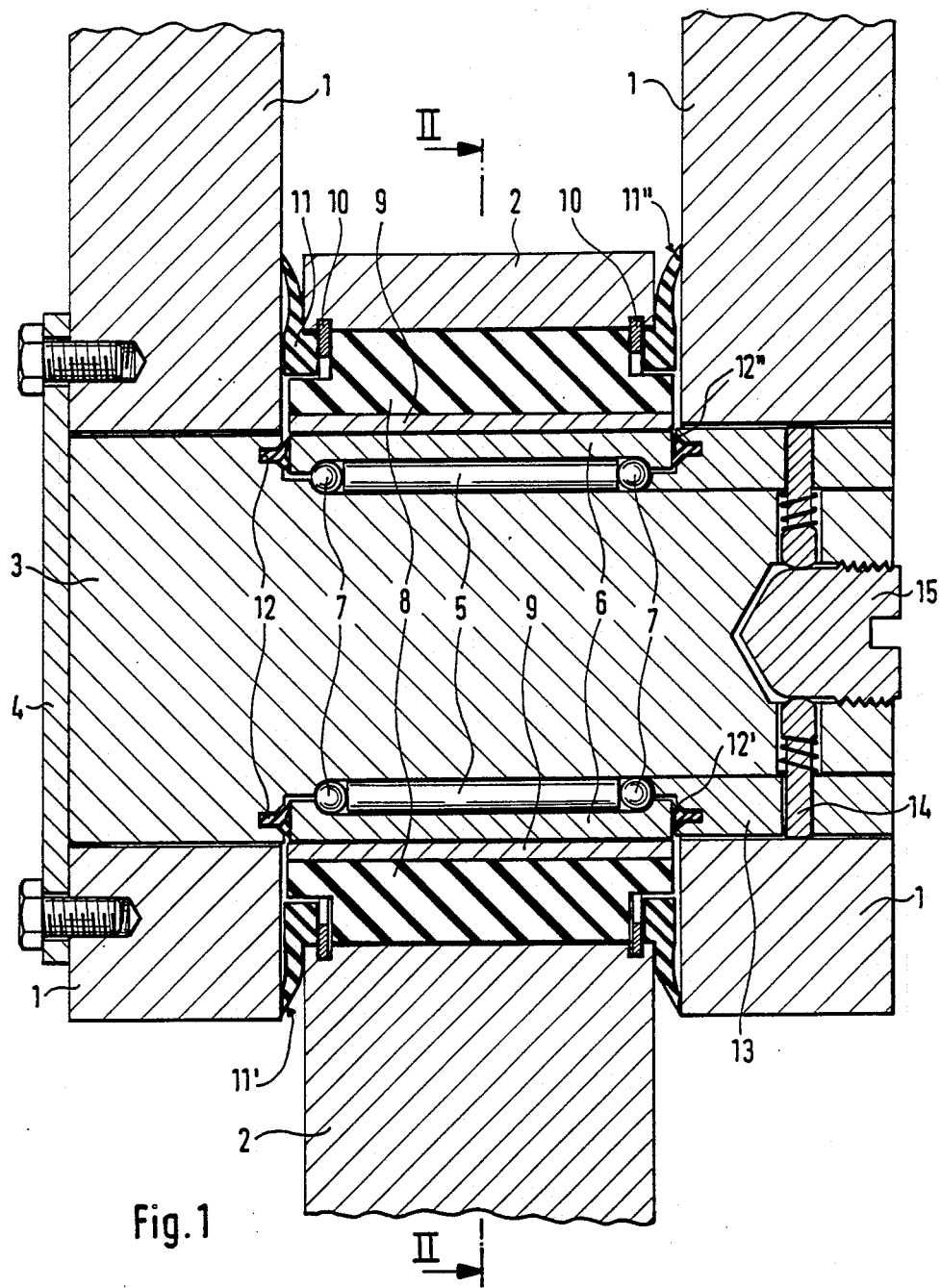
FIG. 1 depicts a section through the articulation joint along line I—I in FIG. 2.
Figure 2:
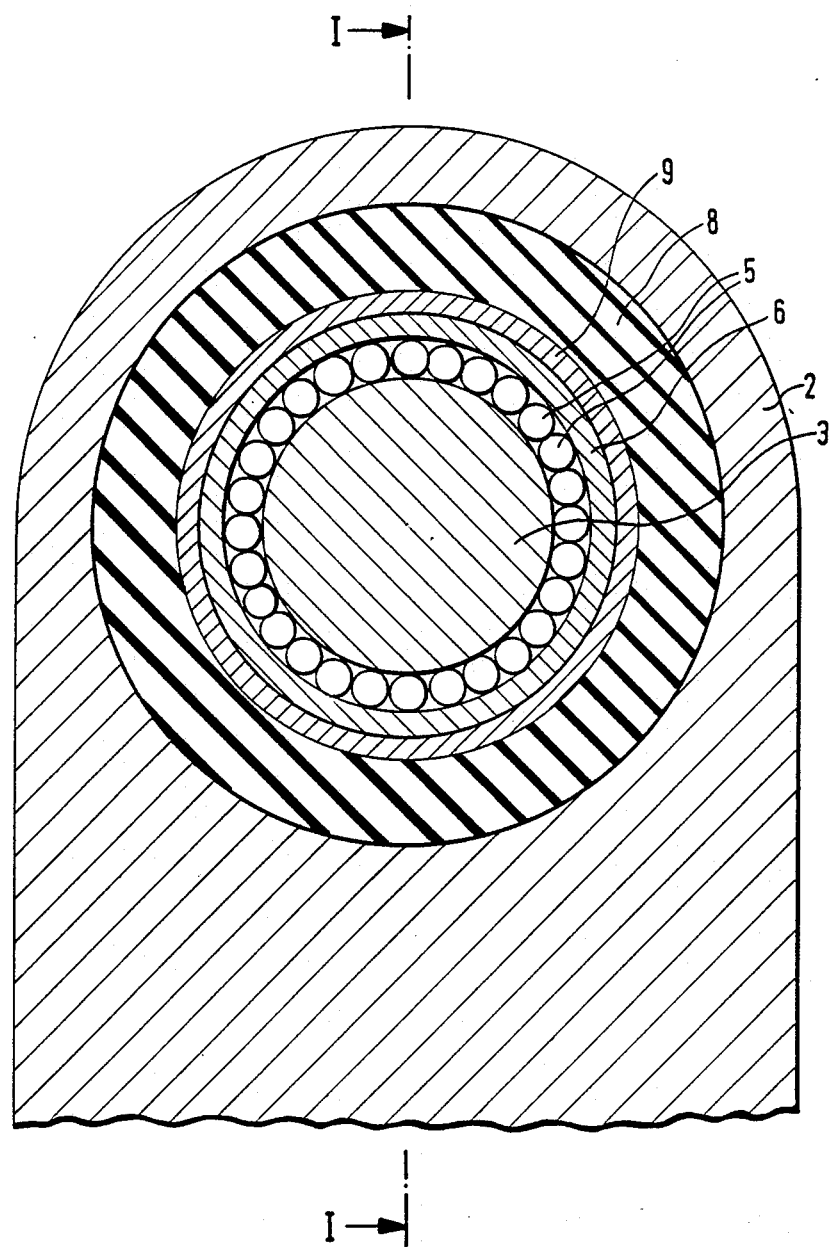
FIG. 2 depicts a section along line II—II in FIG. 1.

In the drawings reference numeral 1 denotes by way of example a typically fork-shaped support boom assembly to which [for example] a tool arm 2 assembly is hinged by means of the articulation joint assembly of the invention. An articulation pin 3 assembly is inserted through corresponding eyes (bores) in the boom fork 1 and tool arm 2, said articulation pin 3 being retained by retainer plates 4 which are securely bolted to the boom fork 1.

In order to minimize radial friction between the articulation pin 3 and tool arm 2 the articulation pin 3 is supported in a roller bearing 5 whose outer race is denoted 6. At either end of the roller bearing 5 are provided ball bearings 7 which act as axial (thrust) bearings and serve to reduce the wear on the ends of the roller bearing 5. The ball bearings 7 likewise contrive to prevent axial play in the joint assembly between the articulation pin 3 and tool arm 2.

The tool arm 2 typically carries a shovel, not shown, and is through this shovel exposed to direct shocks, knocks and vibrations which are a potential source of damage to the bearings and other mechanical parts if permitted to propagate.

The outer race 6 of the roller bearing 5 is circumscribed by a concentric elastic shock ring 8 serving to dampen said blows and vibrations from the tool arm 2. The shock ring 8 likewise has the task of absorbing the thrust forces whenever the tool arm 2 is subjected to twisting moment (torque).

Within the inner surface of the shock ring 8 is attached a metal ring 9. Said metal ring 9 is a press fit onto the outer race 6 of the roller bearing 5 whereby slipping of the metal ring 9 relative to the outer race 6 is precluded.

On either side of the shock ring 8 are retaining rings 10 seated in grooves in the eye of the tool arm 2. Said retaining rings 10 serve to locate said shock ring 8 within the eye of said tool arm 2.

On either side within the eye of the tool arm 2 are fitted rubber packings 11 with a generally L-shaped cross-section, with the longer leg of the L-shape tapering to a thin outer lip 11' whose tip is denoted 11''. Said outer lip 11' and tip 11'' serve to exclude contaminants; while the thick, strong radially inward section of the packing 11 is suitably formed so as to restrain lateral wandering of the tool arm 2 relative to the supporting boom fork 1.

At either end of the outer race 6 of roller bearing 5, articulation pin 3 is furnished with a groove in which is seated a bearing seal 12 of generally Y-shaped cross-section having a double function; firstly by virtue of its radially inward lip 12' to retain bearing grease inside said roller/ball bearing 5, 7; and secondly by virtue of its radially outward lip 12" to exclude contaminants and water from said roller/ball bearing 5, 7.

Whereas the mid-portion of the articulation pin 3 is supported in the roller/ball bearing 5, 6, 7 within the eye of the tool arm 2 by the metal ring 9 and shock ring 8, and one end of the articulation pin 3 is held within the corresponding eye of the boom fork 1, the other end of the articulation pin 3 is designed differently for ease of assembly. At this other end an access ring 13 is removably attached to the articulation pin 3 in order to facilitate installation of the outer race 6, bearing rollers 5 and bearing balls 7 through the right-hand eye of the boom fork 1 in FIG. 1. Said access ring 13 is fastened in place with the aid of four radially oriented spring-loaded locking dogs 14. The springs of the locking dogs 14 tension up as the locking dogs 14 are extended in the locking position. Locking is achieved by tightening a screw device 15 centrally in the articulation pin 3. Said locking dogs 14 also counteract play in the eye of the boom fork 1.

As the screw device 15 holding the locking dogs 14 in locking position is unscrewed (loosened), the springs on the locking dogs 14 force the locking dogs 14 radially inward, enabling the access ring 13 to be withdrawn from the articulation pin 3 and any parts needing replacement to be replaced.

The bearing assembly of the articulation joint of the invention is assembled on articulation pin 3 as follows: Firstly seat the first bearing seal 12 (on left in FIG. 1) into its groove, then press the outer race 6 of the ball/roller bearing 5 about 10 mm onto the articulation pin 3, whereupon the first set of balls 7 can be inserted. Then insert the rollers 5, press the outer race 6 further onto the articulation pin 3 and insert the second set of balls 7 (adjacent to access ring 13). Now press the outer race 6 complete with rollers 5 and balls 7 fully home on the articulation pin 3, thereafter fitting the access ring 13, into which the second bearing seal 12 has been seated, onto the end of the articulation pin 3. Then provisionally fasten the access ring 13 as previously described.

Installation of the articulation pin 3 complete with bearing assembly within the eyes of the tool arm 2 and boom fork 1 is carried out as follows: Firstly insert the shock ring 8 within the eye of the tool arm 2, retaining it with the two above referred to retaining rings 10. Then fit the two rubber packings 11. Position the tool arm 2 between the forks of the boom fork 1 so as to bring all three eyes into alignment, whereupon articulation pin 3 complete with bearing assembly is inserted into place. Further tighten the screw device 15, whereby the outer ends of the locking dogs 14 are wedged by virtue of the conical form of the screw device 15 against the inner surface of the eye in the right-hand fork of the boom fork 1 in FIG. 1. The articulation pin 3 is now stabilized at both ends.

Shock ring 8 and its integral cast metal ring 9 ensure absorption of thrust forces when the tool arm 2 is subjected to twisting moment (torque). The elastic shock dampening therefore serves to take up a substantial part of the severe shocks, knocks and vibrations, thereby preventing propagation on a damaging scale to the rest of the equipment structure.

While this invention has been described with reference to certain exemplary embodiments, it will be recognized by those skilled in the art that many variations are possible without departing from the scope and spirit of the invention and it will be understood that it is intended to cover all changes and modifications of the invention shown herein for the purposes of illustration which do not constitute departures from the spirit and scope of the invention.

We claim:

1. An articulation joint for an articulated boom assembly of the type used on construction machinery such as power cranes, power shovels, back hoes, etc., comprising:
    a supporting boom fork, on the boom assembly, having a first transverse bore formed through fork portions on said boom fork;
    a tool arm positionable between said fork portions so that a second transverse bore formed through said tool arm is axially aligned with said first transverse bore;
    an articulation pin insertable into said first and second bores to join rotatably said boom fork and said tool arm, said pin having a first outer portion and a second outer portion with a reduced diameter when compared to said first outer portion;
    a bearing means positioned between said second outer portion and said tool arm to support rotatably said articulation pin within said tool arm, said means comprising roller bearings positioned about said articulation pin, ball bearings positioned at end portions of said roller bearings, and an outer race positioned about said roller bearings and ball bearings to hold said roller bearings and said ball bearings against said second outer portion, and hold said roller bearings and said ball bearings against each other, so that an outermost surface of said outer race is essentially flush with said first outer portion;
    retaining means, connected to said boom fork, to hold one end portion of said articulation pin within said first and second bores;
    an access ring adjacent an other end portion of said articulation pin; and
    locking means, engageable with said boom fork, said access ring and said articulation pin to prevent the axial movement of said access ring and hold said articulation pin within said first and second bores.

2. The articulation joint according to claim 1, further comprising an elastic shock ring positioned between said outer race and said tool arm to dampen shock, blows and vibrations transmitted through said tool arm.

3. The articulation joint according to claim 2, further comprising an intermediate ring positioned between said outer race and said shock ring.

4. The articulation joint according to claim 3, further comprising retaining rings engageable with grooves in said tool arm formed along the surface of said second bore, said grooves are formed adjacent the ends of said shock ring to hold said shock ring between said retaining rings.

5. The articulation joint according to claim 4, further comprising packings including a thick base section, positioned between said retaining rings and said fork portions to restrain lateral wandering of said tool arm relative to said boom fork, and a lip section extending from said bas section to press against said fork portions so that contaminants are prevented from entering said articulation joint.

6. The articulation joint according to claim 5, further comprising y-shaped bearing seals positioned between end portions of said outer race and bearing seal grooves formed in said articulation pin and said access ring, each said y-shaped bearing seal having a v-shaped portion contacting one of said end portions of said outer race and a stem portion of each said y-shaped bearing seal seated in one of said bearing seal grooves so that grease is retained within, and contaminants are prevented from entering, said bearing means.

7. The articulation joint according to claim 6, wherein a peripheral surface of said access ring is essentially flush with said first outer portion.

8. The articulation joint according to claim 1, wherein said locking means includes spring-biased locking pins radially displaceable in corresponding radial bores in said articulation pin and in said access ring, an axially displaceable screw means moveable along a central cavity formed in said other end portion of said articulation pin to engage said locking pins so that the inward movement of said screw means will cause said locking pins to move radially outwards against said fork portions and hold said articulation pin within said first and second bores, and wherein the outward movement of said screw means allows the spring biasing to retract said locking pins from said corresponding bores in said access ring to release said access ring from said locking means.

9. An articulation joint for an articulated boom assembly of the type used on construction machinery such as power cranes, power shovels, back hoes, etc., comprising:
 a supporting boom fork, on the boom assembly, having a first transverse bore formed through fork portions on said boom fork;
 a tool arm positionable between said fork portions so that a second transverse bore formed within said tool arm is axially aligned with said first transverse bore;
 an articulation pin insertable into said first and second bores to join rotatably said boom fork and said tool arm;
 a bearing means positioned between said articulation pin and said tool arm to support rotatably said articulation pin within said tool arm, said means comprising roller bearings positioned about said articulation pin, ball bearings positioned at end portions of said roller bearings, and an outer race positioned about said roller bearings and said ball bearings to hold said roller bearings and said ball bearings against said articulation pin and hold said roller bearings and said ball bearings against each other;
 an elastic shock ring positioned between said outer race and said tool arm to dampen shock, blows an vibrations transmitted through said tool arm; and
 retainer means, engageable with said boom fork, to hold ends of said articulation pin within said first and second bores.

* * * * *